United States Patent [19]
Martin

[11] Patent Number: 5,517,819
[45] Date of Patent: May 21, 1996

[54] ENGINE FULL AUTHORITY DIGITAL ENGINE CONTROL AUTOMATIC MACH HOLD

[75] Inventor: John F. Martin, Danvers, Mass.

[73] Assignee: General Electric Company, Cincinnati, Ohio

[21] Appl. No.: 359,254

[22] Filed: Dec. 19, 1994

[51] Int. Cl.$^6$ ............................ F02C 6/00; F02C 9/00
[52] U.S. Cl. ............................ 60/204; 60/224; 60/243
[58] Field of Search .............................. 60/39.15, 39.281, 60/204, 224, 233, 239, 243

[56] References Cited

U.S. PATENT DOCUMENTS

| | | | |
|---|---|---|---|
| 4,259,838 | 4/1981 | McCollum et al. | 60/224 |
| 4,296,601 | 10/1981 | Martin | 10/224 |
| 4,303,976 | 12/1981 | Joby | 60/224 |
| 4,551,972 | 11/1985 | Lewis | 60/39.281 |
| 5,058,376 | 10/1991 | Snow | 60/39.15 |

*Primary Examiner*—Louis J. Casaregola
*Attorney, Agent, or Firm*—Andrew C. Hess; Nathan D. Herkamp

[57] ABSTRACT

An engine controller system maintains a desired mach number for an aircraft. The fan speed of a slave engine is synchronized with the fan speed of a master engine. A previous Mach number value is compared with an actual Mach number value to determine a Mach number error. The resulting error corresponds to a fan speed which increases or decreases engine thrust to achieve a Mach number error equal to zero, maintaining the desired aircraft Mach number.

10 Claims, 3 Drawing Sheets

ENGINE FULL AUTHORITY DIGITAL ENGINE CONTROL AUTOMATIC MACH HOLD

BACKGROUND OF THE INVENTION

The present invention relates to aircraft engine systems and, more particularly, to an engine controller system for locking in a desired aircraft Mn during cruise.

Commercial aircraft utilize auto throttle systems which interface with the engine control system either electrically or mechanically in order to control engine thrust and thereby control the aircraft to a desired air speed or Mach Number. The existing auto throttle systems require a separate controller with its associated components to perform this function. However, the cost of such a system, in addition to the certification cost, makes a constant airspeed control feature prohibitive for use by small commercial aircraft.

It is therefore highly desirable and an object of the present invention to provide the ability to maintain an aircraft at a constant airspeed, without incurring the cost currently associated with such a feature.

Another object of the present invention is to provide such an engine automatic mach hold feature without implementing a separate controller with associated components.

Another object of the present invention is to provide an engine automatic mach hold feature which utilizes control logic to achieve a constant airspeed.

These objects and other features and advantages will become more readily apparent in the following description when taken in conjunction with the appended drawings.

SUMMARY OF THE INVENTION

The present invention has been developed to fulfill the needs noted above. The present invention is an engine controller full authority digital engine control (FADEC) based system to lock in the desired Aircraft Mn during cruise. The system of the present invention is particularly suited for use on small commercial aircraft.

In accordance with one aspect of the present invention, an engine control system allows engine speed of an aircraft to be varied so the aircraft will maintain a desired mach number, without continuing pilot intervention. The fan speed of a slave engine is synchronized with the fan speed of a master engine. A previous Mach number value is compared with an actual Mach number value to determine a Mach number error. The resulting error corresponds to a fan speed which increases or decreases engine thrust to achieve a Mach number error equal to zero, maintaining the desired aircraft Mach number.

In the drawings as hereinafter described, a preferred embodiment is depicted; however, various other modifications and alternative constructions can be made thereto without departing from the true spirit and scope of the invention.

DETAILED DESCRIPTION OF THE PREFERRED EMBODIMENTS

In accordance with the present invention, an engine controller Full Authority Digital Engine Control (FADEC) based system is illustrated. The engine controller system is capable of locking in a desired aircraft mach number (Mn) during cruise. In accordance with the present invention, the entire engine controller function is contained within existing engine FADEC systems, which are well-known industry wide, without the need for additional aircraft controllers. Accordingly, the system of the present invention utilizes the inherent capability found on most existing FADEC based engines without requiring any hardware modifications.

Providing a Mn hold function during cruise is advantageous in that it reduces pilot workload, allows for more precise flight management, and can improve engine life by constantly reducing engine thrust as aircraft weight and drag decreases (due to fuel burn).

Figure 1:
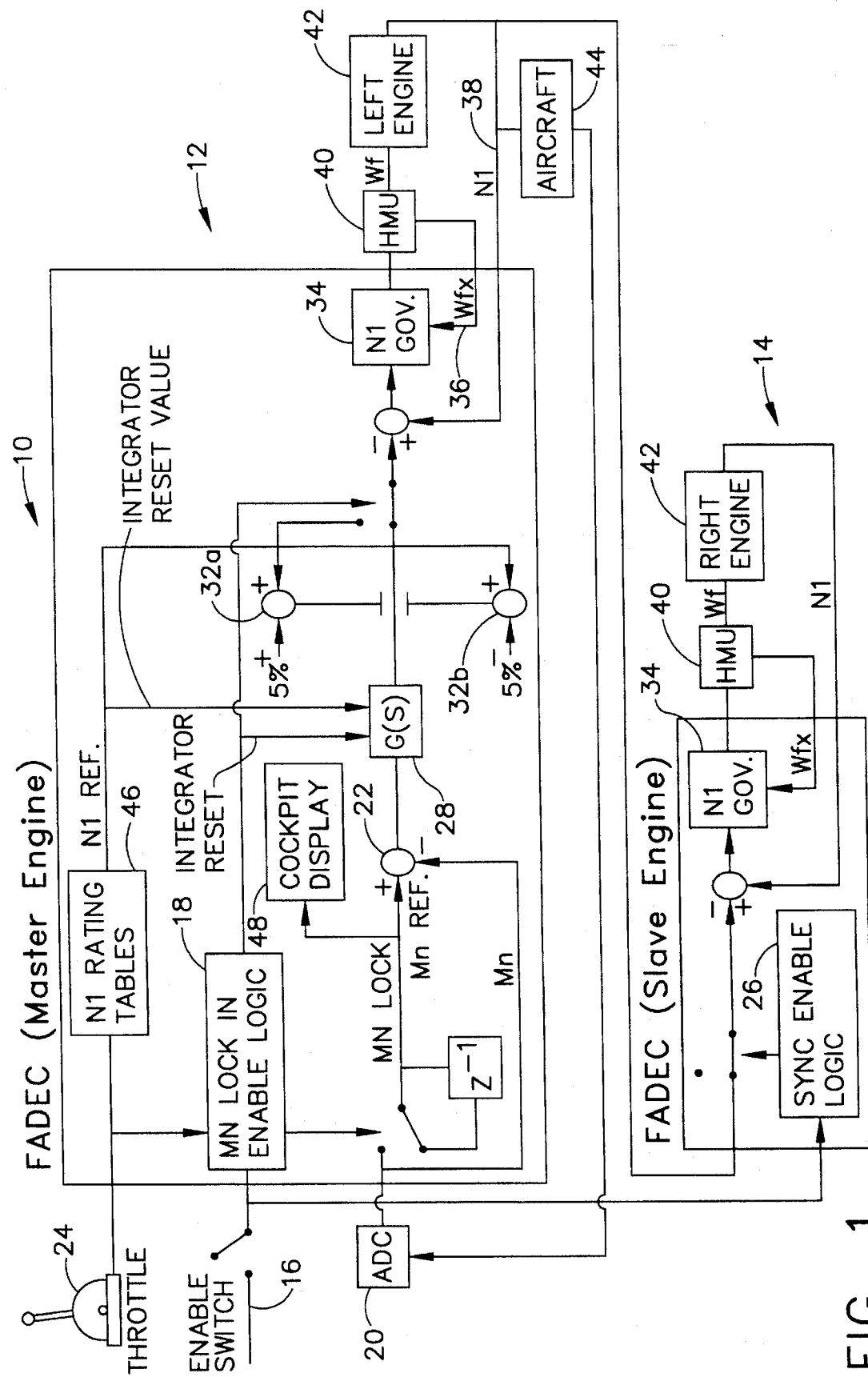
FIG. 1 is a schematic block diagram of a FADEC master and slave engine control system for synchronizing the master and slave engines.
Figure 2:
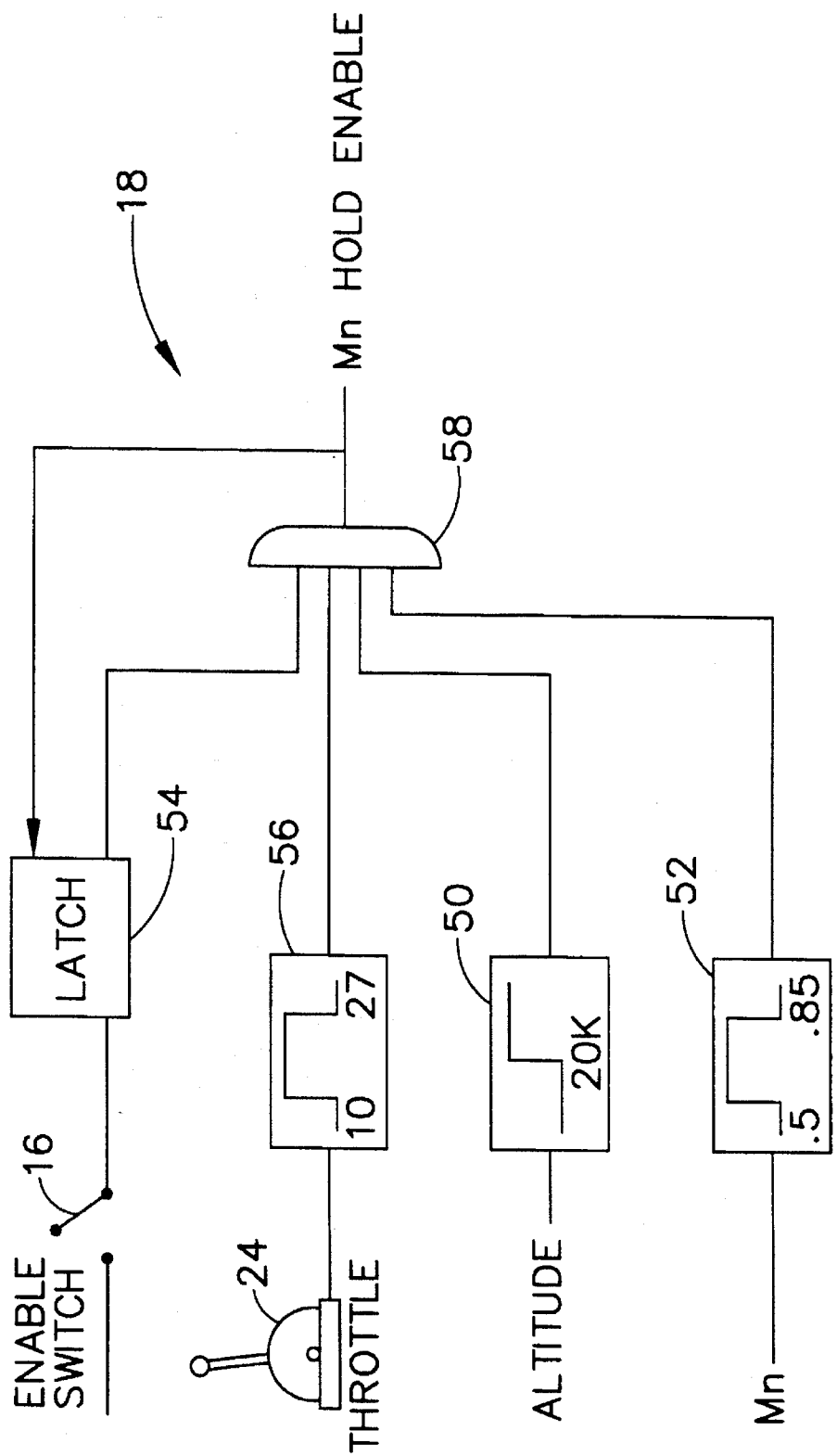
FIG. 2 is a schematic diagram of mach number lock-in enable logic, according to the present invention.

Referring now to the drawings, in FIG. 1 there is illustrated a basic operation of an engine FADEC automatic Mach hold design, in accordance with the present invention. The system 10 comprises a master engine portion 12 and a slave engine portion 14, which are synchronized. An enable switch 16 engages a Mn lock-in enable logic of block 18 when activated by the by the pilot. Once the Mn lock in enable logic of block 18 is satisfied, as illustrated in FIG. 2, the master engine FADEC 12 uses the last Mn value from an Aircraft Air Data Computer (ADC) 20, i.e., the existing computer in the aircraft, known in the art, as a Mn reference. The loop is closed by comparing this Mn reference to the actual Mn at comparator 22, with the resulting error corresponding to a fan speed (N1) which increases (or decreases) engine thrust and brings the Mn error back to zero. In addition, a throttle signal from throttle 24 is used to trim the N1 authority limits to allow additional changes to N1 to hold the desired Mn without having to disengage then re-engage the system.

The FADEC of the other engine FADEC, indicated by reference number 14, uses the same switch input to engage a synchronizing function at synchronizing enable logic block 26, to match its N1 to the N1 value of the master engine. Existing cross engine N1 information is used as part of the synchronizing function.

A function G(s) at block 28 is selected based on engine aircraft and flight control dynamics to ensure stable operation and a robust design to external disturbances. A proportional/integral type controller would be typical with the output of the integrator initialized as the actual N1 at the time the system was engaged. The output of the function G(s) at block 28 would be a N1 reference that would then be banded by authority limits. These authority limits would typically be the N1 selected by the throttle ±5% as indicated at 32a and 32b, respectively. The output of the authority limits are then passed on to N1 governor 34 dynamics in lieu of the throttle N1 reference. A fuel flow position (Wfx) loop 36 and the N1 governor loop 38, are identical to those values used during other nonMach hold control modes. Concurrent with the Mach hold function in the master engine FADEC, the slave engine FADEC synchronizes to match the slave engine N1 speed to the master engine N1.

The present invention utilizes the inherent capability found on most existing FADEC based engines without requiring any hardware modifications. Hence, the existing hardware, such as the hydromechanical unit (HMU) 40, the left and right engine fuel flows indicated at blocks 42, aircraft block 44, and N1 rating tables 46 for converting throttle position, all remain in the system of the present invention, operating in their typical manner. Cockpit display 48 can indicate various features and functions, such as explained in reference to FIG. 3.

Continuing with FIG. 1 and referring now to FIG. 2, details of the Mn lock in enable logic 18 are illustrated. The enable logic is easily customized for any aircraft configuration. In the example shown, Mn Hold enable logic is not activated unless all of various conditions are met. Once latched, in addition to the absolute analog authority limits on throttle position (PLA), Mn, N1, and altitude, N1 cannot change by a value greater than ±5% of the throttle N1 at lock in.

By designing the Mach hold logic for cruise conditions only, the logic assures a limited authority for the Mn hold function and thereby does not introduce additional failure modes or certification concerns. The sequence of events to activate the Mach hold function of the present invention is to bring the aircraft to the desired altitude, indicated at block 50, and the desired Mn, indicated at block 52, to achieve a cruise condition. The enable switch 16 is then turned on, activating the latch function 54. As long as the throttle position, altitude, and Mn are all within the required ranges of blocks 56, 50, and 52, respectively, as provided to AND gate 58, the system engages and the Mn value at the time switch 16 was turned on will be maintained.

The engine FADEC logic according to the present invention interfaces with a cockpit display to provide various indications indicating whether the system is enabled, whether the throttle is pushed, and for displaying aircraft Mn, locked in Mn. The typical sequences and displays are illustrated in FIG. 3.

Figure 3:
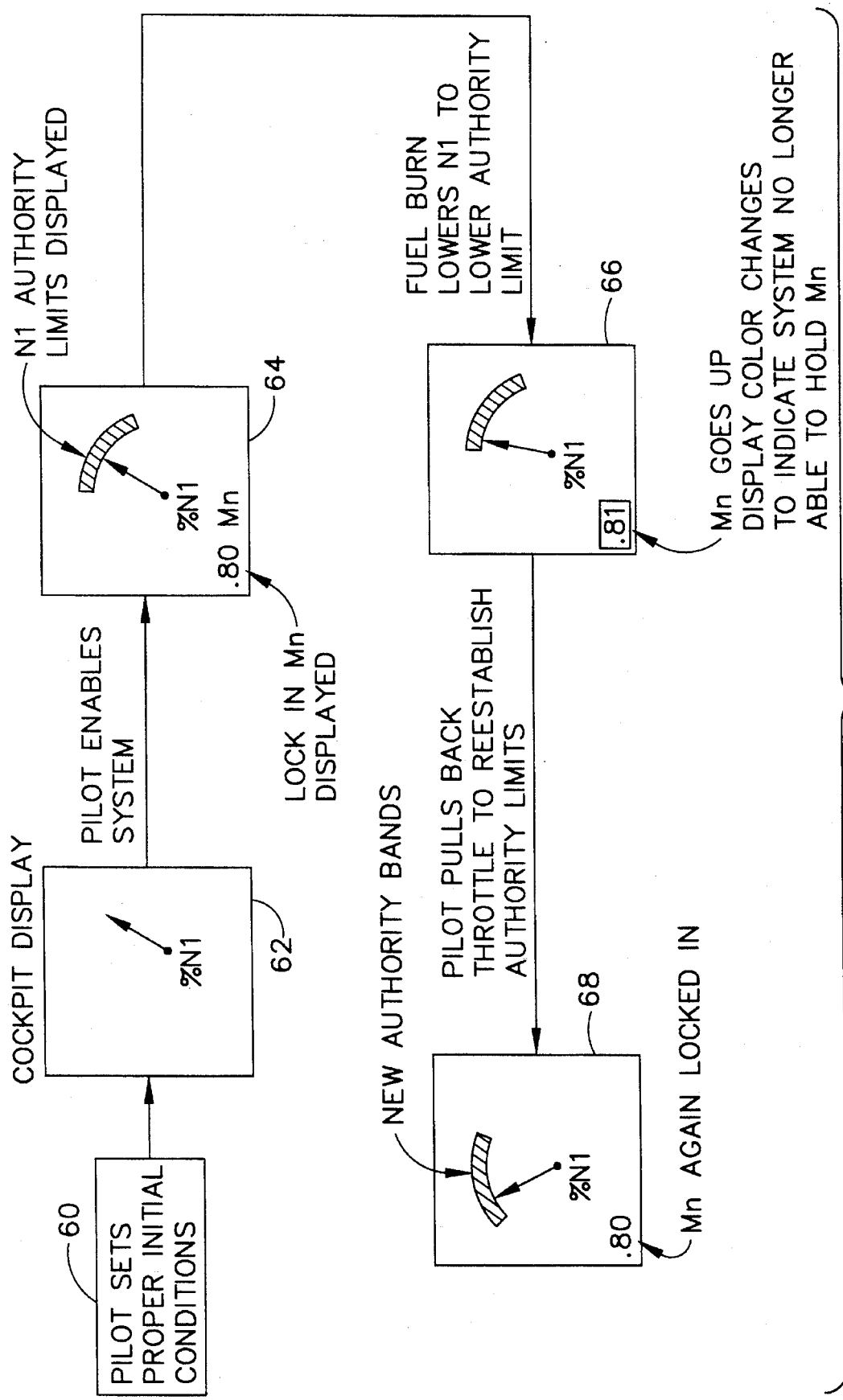
FIG. 3 is a block diagram of an interface with the pilot when implementing the present invention.

In FIG. 3, once the pilot has established the desired cruise conditions at block 60, the % N1 will be displayed at block 62. The enable switch 16 is then activated. The cockpit display will now show the display of block 64, indicating the locked-in Mn value and the N1 authority limits as a band on the N1 display. If N1 reaches an authority limit during the cruise, such as during fuel burn, N1 will not go lower. Also, the Mn indication will change colors, indicating that the desired Mn is no longer locked in, as indicated at block 66. In order to reacquire the desired Mn, the pilot pulls back the throttle to establish new N1 authority limits and allow the original Mn to be obtained, as indicated at block 68.

The present invention provides a Mach number hold feature using the same engine and aircraft electronics already in place on all modern FADEC based engines. By eliminating the recurring cost and weight of a separate controller, and eliminating non-recurring costs associated with additional auto throttle type systems with their additional components, the present invention provides, at minimal cost, a useful feature which reduces pilot workload.

It will be obvious to those skilled in the art that the invention can be modified to suit the individual needs of a particular airframe and/or customer.

It is seen from the foregoing, that the objectives of the present invention are effectively attained, and, since certain changes may be made in the construction set forth, it is intended that matters of detail be taken as illustrative and not in a limiting sense.

What is claimed is:

1. A method for maintaining a desired mach number for an aircraft, the method comprising the steps of:

providing a master engine;

synchronizing a fan speed of a slave engine with a fan speed of the master engine;

engaging a Mach number lock-in enable for locking in a desired aircraft Mach number;

comparing a previous Mach number value with an actual Mach number value to determine a Mach number error;

altering engine thrust to achieve a Mach number error equal to zero and maintain the desired aircraft Mach number.

2. A method for maintaining a desired mach number for an aircraft as claimed in claim 1 wherein the step of engaging a Mach number lock-in enable further comprises the step of using an engine controller system to lock in the desired aircraft Mach number during cruise.

3. A method for maintaining a desired mach number for an aircraft as claimed in claim 2 wherein the engine controller system comprises a full authority digital engine control.

4. A method for maintaining a desired mach number for an aircraft as claimed in claim 1 wherein the step of engaging a Mach number lock-in enable further comprises the step of using a pilot-activated enable switch.

5. A method for maintaining a desired mach number for an aircraft as claimed in claim 1 wherein the previous Mach number comprises the previous Mach number from an aircraft air data computer.

6. A method for maintaining a desired mach number for an aircraft as claimed in claim 1 wherein the Mach number error corresponds to a fan speed which alters engine thrust to bring the Mach number error to zero.

7. A method for maintaining a desired mach number for an aircraft as claimed in claim 1 further comprising the step of using a throttle signal to trim authority limits of the fan speed to allow additional changes to the fan speed to hold the desired Mach number.

8. An engine controller system for maintaining a desired mach number for an aircraft, the system comprising:

a master engine having a fan speed;

a slave engine having a fan speed, the fan speed of the slave engine being synchronized with the fan speed of the master engine;

a Mach number lock-in enable for locking in a desired aircraft Mach number;

comparator means for comparing a previous Mach number value with an actual Mach number value to determine a Mach number error;

means for altering engine thrust to achieve a Mach number error equal to zero and maintain the desired aircraft Mach number.

9. An engine controller system as claimed in claim 8 wherein the Mach number error corresponds to a fan speed which alters engine thrust to bring the Mach number error to zero.

10. An engine controller system as claimed in claim 8 further comprising a throttle signal to trim authority limits of the fan speed to allow additional changes to the fan speed to hold the desired Mach number.

\* \* \* \* \*